Figure 1:
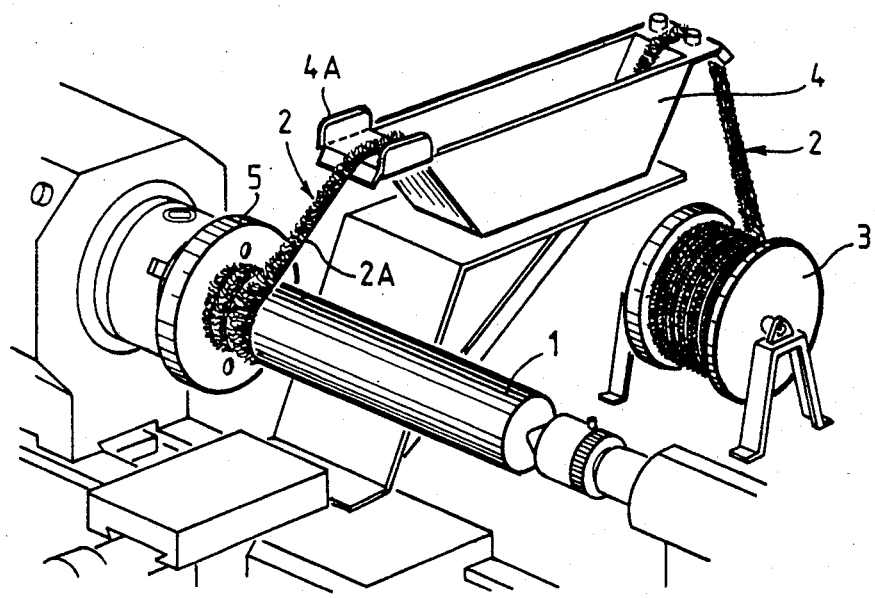

United States Patent [19]

Ferrier

[11] Patent Number: 4,655,866
[45] Date of Patent: Apr. 7, 1987

[54] DEVICE FOR THERMAL PROTECTION FROM ABLATION AND VIBRATIONS AND MANUFACTURING METHOD

[75] Inventor: Christiane Ferrier, Essonne, France

[73] Assignee: Aerospatiale Societe Nationale Industrielle, Paris, France

[21] Appl. No.: 764,068

[22] Filed: Aug. 9, 1985

[30] Foreign Application Priority Data

Aug. 14, 1984 [FR] France ............................. 84 12782

[51] Int. Cl.⁴ .............................................. B32B 1/00
[52] U.S. Cl. ........................................ 156/192; 89/15; 102/289; 156/195; 156/173; 156/294
[58] Field of Search ................................ 156/190–192, 156/195, 184, 189, 294, 173, 175; 102/284–291; 264/3 R; 89/15, 16

[56] References Cited

U.S. PATENT DOCUMENTS

| | | |
|---|---|---|
| 3,140,968 | 7/1964 | Barrios . |
| 3,187,503 | 6/1965 | Taylor . |
| 3,200,750 | 8/1965 | Burrows . |
| 3,207,640 | 9/1965 | Walker ............................ 156/294 X |
| 3,311,013 | 3/1967 | Phipps . |
| 3,573,123 | 3/1971 | Siegel et al. . |
| 3,577,294 | 5/1971 | David . |
| 3,641,870 | 2/1972 | Eig .................................. 156/195 X |
| 3,933,310 | 1/1976 | Hickox . |
| 3,960,626 | 6/1976 | Casadevall ...................... 156/189 X |
| 4,148,675 | 4/1979 | Ratté et al. ...................... 156/294 X |
| 4,426,038 | 1/1984 | Inman et al. . |

FOREIGN PATENT DOCUMENTS

| | | |
|---|---|---|
| 1360411 | 4/1963 | France . |
| 1359967 | 4/1963 | France . |
| 2538507 | 6/1984 | France . |
| 429466 | 7/1967 | Switzerland . |
| 480615 | 12/1969 | Switzerland . |

Primary Examiner—David Simmons
Attorney, Agent, or Firm—Browdy and Neimark

[57] ABSTRACT

A thermal protection device is intended for protecting structures submitted to high temperature and high speed ablative flow in the presence of high frequency vibrations and of the type comprising an armature containing a binder layer. The armature is a fringed meshing comprising a meshed portion submitted to ablative flow and fringes thereon directed to the structure surface to be protected with a predetermined orientation relative to the direction of said flow. Such a device is obtained for example by winding on a mandrel a fringed strip previously impregnated with a polymerizable resin which is polymerized after forming. The device can protect reactor conduits conveying high temperature corrosive gases.

20 Claims, 6 Drawing Figures

DEVICE FOR THERMAL PROTECTION FROM ABLATION AND VIBRATIONS AND MANUFACTURING METHOD

This invention generally concerns thermal protection of walls submitted to the presence of ablative flow thereon.

More particularly, the invention relates to the design of an internal thermal protection device and a method of manufacturing it, intended for hollow structures submitted to ablative flow of corrosive high speed and high temperature gases and high level vibrations, in particular those inherent to operative conditions. In the most frequent case, the hollow structures are open at their ends and are currently designated as "conduits".

According to the present state of the art, the thermal protection layers of such structures are constituted by organic, organo-metallic or mineral binder composites capable of including therein reinforcements of the powder, fiber, organic or mineral fabric type. Under the effect of hot gases thereon, the ablatable material is submitted to a pyrolysis phenomenon. Pyrolysis is accompanied with degradation of the carbonaceous or organo-silicic chain of the binder thereby rendering the scoria fragile and breakable in bulk. To remedy such brittleness the thermal protection layer is currently reinforced according to various methods.

It is actually known that in an ablatable material of this type submitted to hot gas erosion and vibrations, ablation is reduced where the material is reinforced. The armature embedded into the insulating material can be metallic or non metallic, woven or fibrous. The more perpendicularly to the direction of gas flow the fibrous or woven reinforcement is anchored and oriented in the matrix, the lower the ablation thereof, whereas thermal transfer is the lowest where the reinforcement is oriented in the direction of gas flow.

The armatures are most often metallic and solidly secured by welding to the walls of a metallic chamber in accordance with the method described for example in "Aviation Week Space Technology" of Apr. 27, 1981, on page 176, which has recourse to complex weaving metallic networks. The reinforcements or armatures can be formed from various wire nettings reinforced with refractory fibers, honeycombs, materials of the fiber type, in accordance in particular with the methods described in French Pat. No. 2506901, U.S. Pat. No. 3,617,416 or U.S. Pat. No. 3,694,284.

In order for the meshes to be efficient they require complex filling means with loaded binder, for example, through centrifugation such as described in the above-mentioned article. Moreover, steel armatures do not appear to suitably resist extreme temperatures whereas the use of non metallic meshed armatures require that they be positioned by glueing onto the structure.

Other methods employ materials obtained from preforms of refractory fibers woven in three directions.

In the known methods the anchoring of the insulating polymerized substance is provided by reinforcements mobilizing said substance, the reinforcements being secured to the wall to be protected.

All of the known methods result in a complex realization and laborious positioning.

Apart from complexities in the realization, a major inconvenience of the presently known thermal protection devices is that the insulating, polymerized, exposed substance is directly submitted to the ablative jet.

The object of this invention is to remedy these multiple disadvantages in particular by reducing vulnerability of the superficial layers of the thermal protection device which are in direct contact with the ablative jet. A further object of this invention is a method of manufacturing such an improved device which can be readily carried out.

Therefore, the invention proposes a thermal protection device for protection of structures submitted to high temperature ablative flow in the presence of vibrations, of the type formed of a binder layer containing an armature therein, characterized in that said armature is a fringed meshing comprising a mesh portion submitted to the ablative flow and fringes thereon directed to the structure surface to be protected, with a predetermined orientation relative to the direction of said flow.

The armature in a device according to the invention thus comprises a meshing, generally looped or curled in contact with the ablative flow and provided with fringes thereon constituting reinforcement mobilizing the thermally insulating binder.

In practice, the meshing is selected advantageously so as to resist for several tens of seconds to a temperature of up to 2000° C., in the presence of vibrations, the frequency of which can be of about 1000 to about 2500 Hz. The meshed portion of the fringed meshing is preferably a three-dimensional network and it is formed from a material which preferably is thermally insulating and/or refractory and adapted to be spun or woven. It can be, notably, cotton, polyamide fibers (Kevlar), glass, silico-aluminous fibers, carbon or silicon carbide. As to the binder, in practice it is a heat settable resin of a heat stable rigidimeric nature (such as an organic, phenolic, furannic, polyimide or polystyrilpyridin (PSD) resin), an organic resin (for example silicone), a mineral based material (for example silicate) or a resin of an elastomeric nature (for example silicone).

According to a preferred mode of embodiment, in case of internal protection of hollow conduits, the fringed meshing is formed from a helically fringed strip.

In the latter case, the invention also proposes a method of manufacturing wherein a fringed strip comprising a meshing and fringes thereon is moved through an impregnation resin, such strip is wound on a mandrel such that the meshing is in contact with such mandrel, the fringes are oriented at a given inclination relative to the axis of the mandrel, the impregnated wound strip is formed under pressure and the impregnation resin is polymerized.

It is recommended according to the invention that resin polymerization occurs after engaging the impregnated strip into a structure to be protected, generally after a preliminary forming under pressure. In a variation, polymerization occurs in any site so as to provide a storable internal protection device ready for use.

Other objects, characteristics and advantages of this invention will appear from the following description which is given by way of non limitative example with reference to the attached drawings in which:

FIG. 1 is a schematic perspective view of an installation for manufacturing by winding a thermal protection device according to the invention; and FIGS. 2 through 6 are sectional views of various fringed meshings usable according to the invention.

FIG. 1 partly illustrates an example of manufacturing of a thermal protection device for protecting the inner wall of a conduit to convey an ablative flow therein.

The exemplifying method consists of winding about a suitable mandrel 1 a fringed meshing or textile 2 of a type readily provided in a weaving workshop. Said fringed textile such as plait, braid or fringed strip presents an undeformable meshed portion 2A comprising meshes of little dimensions and fringes or fibers 2B.

The manufacturing of the inner thermal protection device proposed by way of example takes place in two steps:
  in a first period, a raw blank impregnated on a mandrel is prepared, and
  in a second period, the thermal protection device proper is realized.

The preparation of the blank as illustrated in FIG. 1 consists of:
  unwinding a fringed braid 2 stored on a reel 3,
  impregnating it with resin in a suitable tank 4,
  guiding it at 4A during the winding thereof on the mandrel 1 such that its fringes are oriented so as to be turned away from the surface of the mandrel to be protected according to a determined axial inclination relative to the direction of the ablative flow as defined as a function of the characteristics of the latter;
  maintaining it in this state during moulding of the resin (by means not shown) and
  dispersing by means of a comb (not shown) said resin impregnated fringes so as to obtain a mandrel and impregnated winding assembly.

For the final realization of the thermal protection device two methods are described hereinafter:
  according to a first variation of the method, the mandrel and impregnated winding assembly is:
    introduced into the conduit to be thermally protected,
    formed under pressure and then
    polymerized in situ,
  thereby directly obtaining a thermally protected conduit;
  according to a second variation of the method, the mandrel and impregnated winding assembly is:
    introduced into a mould,
    preformed under pressure,
    polymerized in said mould, and
    stripped from the mould.
  thereby obtaining an independent thermal protection device directly usable in adaptive hollow conduits, after securement thereto according to any method.

According to a particular form of embodiment, permitting to test the obtained material, fringed braids having profiles similar to those shown in FIGS. 2, 3, 4, 5 or 6 and such as can be provided by the firm "Les Manufactures Reunies de Saint Chamond" were wound on a cylindric mandrel of a diameter of 214 mm and a length of 200 mm. Such fringed braids, for example processed from carbon with a precursor PAN comprise a fractional or whole multiple n of 3000 filaments (n=½, 1, 2, 3 or 6).

For an ablation layer of a thickness of 8 mm, a thickness of 19 mm was selected for the fringed braids.

Impregnation was achieved by passing them through a silicone bath loaded with silica and silicon carbide (for example, of the RTV 630 GE type or equivalent, with 18% of silicon carbide). After dipping, the binder rate was regulated by forcibly passing the impregnated braid through a calibrated 4 mm slot.

The inclination angle of the fibers of said braid onto the generatrix of the mandrel was given by the chamfered edge of the starting winding flange 5 and in the present case was selected to be equal to 45°.

The winding pitch was 2 mm with a rotational speed of the mandrel of 2 rotations per minute.

The mandrel provided with the impregnated and so wound up fringed braid was thereafter brought into a cylindric mould of an inner diameter of 230 mm. The ablation layer was formed by pressing by means of a die, of which the pressing surface was parallel to the chamfered surface of the starting flange. The pressure applied thereto was 50 bars. The layer was then polymerized by heating to 60° C. for at least 4 hours.

After polymerization a cylindric, supple crown of a length of 160 mm was obtained.

The composition of the protective layer was such that the fringed reinforcement amounted to from 15 to 18% of the weight of the material.

According to the above described method, various test samples were realized by means of cylindric crowns covering their inner wall. Samples were realized by using:
  ablation layers with fringed braids with a polyester or kevlar binder,
  ablation layers in which a polyester binder also fixes a carbon wick,
  reinforcement layers containing 18000 or 6000 filaments.

Samples were submitted to tests in a combustion chamber of stato-reactor at a temperature higher than 2000° C. and high frequency vibrations (1300 Hz) accompanying combustion. The duration of a test was several tens of seconds.

The efficiency of the meshing 2A and of the fringed braid and its anchoring by dispersed fibers 2B could be confirmed.

During such tests, the temperature on the outer wall of the test chamber reached only about 90° C., 25 seconds after stopping combustion.

A fringed reinforcement with reduced carbon contents was realized according to a modified method explained hereinafter. The fringed braid was selected depleted of elementary fibers (1000 to 3000 filaments) within the scope of the operative mode according to the invention. Between each winding of fringed reinforcement there was introduced a silicone composition loaded with zirconium or silicon carbide and short fibers (5 mm) of carbon or silica or silicon carbide. The composition of the additive was: RTV 630: 76%; 5 mm-fiber carbon: 6%; SiC: 18%.

According to this mode of embodiment, the proportion of oriented reinforcement in the obtained thermal protection was reduced to 8 to 11% by weight.

With samples of a thermal protection device utilizing such a carbon contents, the cold wall temperature as measured after tests was found to be lower than 65° C.

Figure 4:
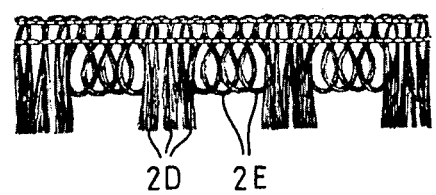

A layer containing from 8 to 11% of fringed reinforcement of a profile similar to that of FIG. 4 efficiently protected a combustion chamber for several minutes without the temperature of the chamber metallic structure exceeding 400° C.

According to another modified form of embodiment, the utilization of an ablation layer reinforced with fringed braids obtained from silicon carbide and processed from wicks containing 500 filaments permitted substantial reduction of thermal conductivity of the protection for the whole period of use.

According to still another form of embodiment, the use of silica fibers also permitted to reduce conductivity of the protective device.

According to a further mode of embodiment, the protective device was realized from a rigidimeric material of very high thermal characteristics obtained by adopting, for impregnation of the fringed braid, a heat settable and heat hardened resin such as a phenolic resin.

Figure 5:
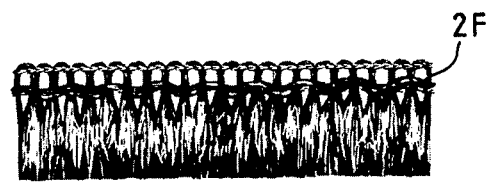

According to a more sophisticated variation of the mentioned manufacturing method, another definition of the protective device had recourse to the use of a fringed braid, comprising a carbon wick in its binder such as shown in FIG. 5, combined with the use of a method comprising a non jointive helical winding on the one hand, and on the other hand, after removal of the solvents, a moulding under a pressure of 20 to 40 MPa. The so realized protective device was formed as a rigid tube or reinforced mechanical strength.

Figure 2:
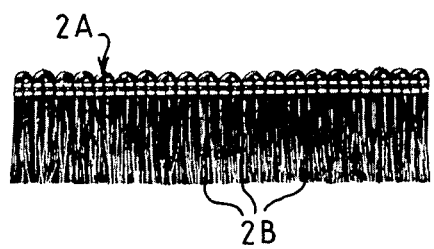
Figure 3:
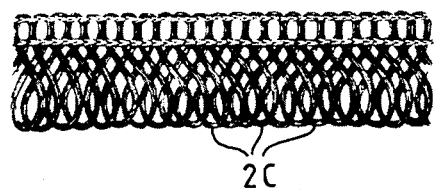

FIGS. 2 to 6 are cross-sectional view of exemplifying forms of embodiment of fringed meshings usable in a thermal protection device according to the invention. FIG. 2 shows free strands 2B consolidated by bondings or bindings constituting the mesh portion 2A. In FIG. 3 the fringes are formed by curled strands 2C. The fringes in FIG. 4 alternately comprise free strands 2D and curled strands 2E, which conjointly form crenels. The fringed meshing in FIG. 5 comprises free strands 2B similar to those of FIG. 2 and a transverse wick 2F taken within the binding 2A.

Figure 6:
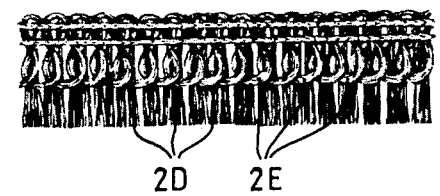

Finally, FIG. 6 represents free strands 2D and curled strands 2E superposed on one another.

It will be understood that the foregoing description was only proposed by way of indication and that many modified forms of embodiment can be proposed by the man of the art without departing form the scope of the invention.

Thus, for example, the fringed meshing instead of being a helically wound strip can be, in case of inner protection of a conduit, a supple, fringed, woven panel curved up so as to surround mandrel 1.

Moreover, the weight percentage of the armature relative to the thermal protection device, for each determined type of fringed meshing, can be of a value selected between 5 and 80%; the proportion of meshing relative to said devices is in practice defined within 2%.

Most generally, the invention applies to the protection of hollow structures having a monotonous evolutive cross-section by means of a binder (generally, a polymerized insulating resin containing an armature).

I claim:

1. A thermal protection device for protecting hollow structures of a monotonous evolutive cross-section intended to be submitted to high temperature ablative flow in the presence of vibrations, of the type formed by a layer of insulating polymerized resin forming a binder and containing an armature therein, said armature being a fringed meshing comprising a meshed portion submitted to said ablative flow thereon and fringes directed in a predetermined orientation relative to the direction of said flow toward the structure surface to be protected.

2. A device according to claim 1, wherein the meshed portion forms a substantially undeformable three-dimensional network.

3. A device according to claim 1, wherein the percentage by weight of the armature relative to said device, for each determined type of fringed meshing, is of a value selected between 5 and 80%, with the proportion of meshing relative to said device being defined within 2%.

4. A device according to claim 1, wherein the meshed portion is adapted to resist a temperature of 2000° C. for several tens of seconds.

5. A device according to claim 1, wherein the impregnated and polymerized meshed portion is adapted to resist for several tens of seconds to vibrations having a frequency in the order of 1000 to 2500 Hz.

6. A device according to claim 1, wherein the fringed meshing is formed at least partly from a weavable refractory material.

7. A device according to claim 1, wherein the fringed meshing is formed at least partly from a thermally insulating weavable material.

8. A device according to claim 1, wherein the fringed meshing contains at least one material selected from the group comprising carbon, silica, silicon carbide, glass, aromatic polyamide fibers, silico-alumina.

9. A device according to claim 1, wherein the binder is a heat settable resin of a rigidimeric heat stable nature selected from the group of an organic, phenolic, furannic, polyimide or polystyrilpyridin resin.

10. A device according to claim 1, wherein the binder is a silicone resin.

11. A device according to claim 1, wherein the binder is a silicate.

12. A device according to claim 10, wherein the binder is an elastomeric silicone.

13. A device according to claim 1, adapted to internal protection of a hollow structure in which the armature is a helically wound fringed strip.

14. A method of manufacturing a thermal protection device for internal protection of hollow conduits comprising moving a fringed strip through an impregnation resin, winding such a strip onto a mandrel so that the meshing is in contact with the mandrel, orienting the fringes to the wall to be protected at a given inclination relative to the mandrel axis, forming under pressure the wound impregnated strip and polymerizing the impregnation resin.

15. A method according to claim 14, wherein the impregnation resin is polymerized in situ after engaging the wound impregnated strip into a conduit to be protected.

16. A method according to claim 14, wherein the impregnated strip is calibrated prior to winding thereof so as to regulate the impregnation resin contents.

17. A method according to claim 16, wherein the fringes are dispersed after winding.

18. A device according to claim 1 wherein the fringed meshing is formed of curled strands.

19. A device according to claim 1 wherein the fringed meshing is formed of alternating curled strands and free strands.

20. A device according to claim 1 wherein the fringed meshing is formed of free strands and curled strands superposed on one another.

* * * * *